United States Patent
Bawolek et al.

(10) Patent No.: US 6,825,470 B1
(45) Date of Patent: Nov. 30, 2004

(54) INFRARED CORRECTION SYSTEM

(75) Inventors: Edward J. Bawolek, Chandler, AZ (US); Jean-Charles Korta, Phoenix, AZ (US); Walter J. Mack, Chandler, AZ (US); Tinku Acharya, Tempe, AZ (US); Ping-Sing Tsai, Gilbert, AZ (US); Gregory W. Starr, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1002 days.

(21) Appl. No.: 09/126,203

(22) Filed: Jul. 30, 1998

Related U.S. Application Data

(63) Continuation-in-part of application No. 09/041,976, filed on Mar. 13, 1998, now Pat. No. 6,211,521.

(51) Int. Cl.$^7$ .................................................. G01J 3/51
(52) U.S. Cl. .................................. 250/339.05; 250/226
(58) Field of Search ...................... 250/339.05, 208.1, 250/226, 214.1, 339.02, 339.01, 338.4, 338.1; 257/431, 432, 435; 348/272, 273, 274, 275, 277, 280

(56) References Cited

U.S. PATENT DOCUMENTS

| | | | | |
|---|---|---|---|---|
| 4,016,597 A | * | 4/1977 | Dillon et al. ............... | 348/266 |
| 5,673,336 A | | 9/1997 | Edgar et al. | |
| 5,914,749 A | * | 6/1999 | Bawolek et al. ........... | 348/273 |
| 5,929,432 A | * | 7/1999 | Yamakawa ................ | 250/208.1 |
| 6,020,582 A | * | 2/2000 | Bawolek et al. ........ | 250/208.1 |
| 6,057,586 A | * | 5/2000 | Bawolek et al. ............ | 257/435 |

FOREIGN PATENT DOCUMENTS

| | | |
|---|---|---|
| EP | 0 605 898 A1 | 7/1994 |
| WO | WO 96/41481 | 12/1996 |
| WO | WO 9950917 | * 10/1999 ............ H01L/37/00 |
| WO | WO 9967944 | * 12/1999 ............ H04N/3/14 |

OTHER PUBLICATIONS

CRi VS–RGB–GP Liquid Crystal Tunable Filter. Datasheet RGB–01 [online]. Cambridge Research & Instrumentation, Inc., Rev. 1098 [presumed to be Oct. 1998; retrieved on Jul. 20, 2001]. Retrieved from the Internet: <URL: www.phototechnica.co.jp/pdf/vs–rgb3.pdf>.*

CRi VariSpec Tunable Imaging Filter. Datasheet [online]. Cambridge Research & Instrumentation, Inc., 2001 [retrieved Jul. 9, 2001]. Retrieved from the Internet: <URL: www.cri–inc.com/data/pdf/VariSpec_Std_010501.pdf>.*

CRi Customer Support—FAQ. Web page [online]. Cambridge Research & Instrumentation, Inc., 2001 [retrieved Jul. 20, 2001]. Retrieved from the Internet <URL: www.cri–inc.com/support/index.shtml>.*

Gary D. Sharp, Scott E. Gilman, and Kristina M. Johnson, "Progress in Field–Sequential Color Shutter Technology." *Proc. SPIE*, vol. 3013, pp. 107–111, May 1997.*

Patent Abstracts of Japan, vol. 1 18, No. 378, Jul. 15, 1994.

* cited by examiner

*Primary Examiner*—Constantine Hannaher
(74) *Attorney, Agent, or Firm*—Trop, Pruner & Hu, P.C.

(57) ABSTRACT

An imaging system using a color shutter receives signals indicative of color information in a plurality of planes together with infrared information and a signal indicative of the infrared radiation alone. The infrared radiation signal may be subtracted from the signals associated with the color planes to develop signals free of infrared radiation effects for each of the desired color planes. In addition an infrared signal is available which may have useful applications in some situations. In this way, color information color bands may be obtained without the need an infrared filter and infrared information is retained for use in other applications if desired. In addition infrared and dark current information may be derived that can be used for dark current correction.

24 Claims, 5 Drawing Sheets

FIG. 6

| R | G | B | IR (R + B) |
|---|---|---|---|
| G | B | IR (R + B) | R |
| B | IR (R + B) | R | G |
| IR (R + B) | R | G | B |

FIG. 7

| R | G | IR (R + B) |
|---|---|---|
| G | B | G |

FIG. 8

| W | IR (R + B) |
|---|---|
| W | W |

US 6,825,470 B1

INFRARED CORRECTION SYSTEM

CROSS-REFERENCE TO RELATED APPLICATION

This is a continuation-in-part of U.S. patent application Ser. No. 09/041,976, filed Mar. 13, 1998 now U.S. Pat. No. 6,211,521.

BACKGROUND

This invention relates generally to imaging systems which may be used, for example, in connection with digital cameras, scanners, and the like.

Imaging sensors based on silicon technology typically use an infrared blocking element in the optical chain. The purpose of this infrared blocking element is to prevent infrared radiation (IR) or light (typically considered to be light with a wavelength longer than 780 nm) from entering the imaging array.

Silicon-based devices are typically sensitive to light with wavelengths up to approximately 1200 nm. If the IR is permitted to enter the array, the array responds to the IR, and generates an output image signal. Since one purpose of an imaging system is to create a representation of visible light, the IR introduces a false response and distorts the image produced by the imaging system. In a monochrome (black and white) imaging system, the result can be an obviously distorted rendition. For example, foliage and human skin tones may appear unusually light. In a color imaging system, the introduction of IR distorts the coloration and produces an image with incorrect color.

A common method for preventing IR based anomalies in imaging systems uses ionically colored glass or a thin-film optical coating on glass to create an optical element which passes visible light (typically from 380 nm to 780nm) and blocks the IR. This element can be placed in front of the lens system, located within the lens system, or it can be incorporated into the imaging system package. The principal disadvantages to this approach are cost and added system complexity. Thin film coatings can be implemented at somewhat lower cost, but suffer from the additional disadvantages of exhibiting a spectral shift as a function of angle. Thus, in an imaging system these elements do not provide a uniform transmittance characteristic from the center of the image field to the edge. Both filter types add to the system complexity by introducing an extra piece-part which must be assembled into the imaging system.

Digital imaging systems generally correct for what is called dark current. Dark current is what is detected by the imaging system when in fact no input image has been received. Generally dark current is isolated and subtracted either during a calibration process of the camera or on an ongoing basis. Mechanical shutters may be used to block off the optical system in between frames to provide a continuing indicia of dark current noise. This may be valuable because dark current is a strong function of temperature. Thus, it may be desirable to have a continuing indication of present dark current conditions. Dark current may also be continuously determined by providing certain pixels which are shielded from light to provide an indication of on-going dark current conditions.

Thus, there is a continuing need for imaging systems which reduce complexity and cost. In particular there is a need for a system which is sensitive to light in the visible spectrum and which is insensitive to light in the infrared spectrum, without requiring an infrared filter. Moreover, there is a need for a system which can continuously correct for the effects of both dark current and infrared noise.

SUMMARY

In accordance with one embodiment, an imaging system includes a shutter that is selectively tunable in a first state to pass at radiation in the visible spectrum. In a second state, the shutter substantially blocks light in the visible spectrum while passing infrared radiation. A subtractor subtracts signals indicative of the radiation passed in the first and second states.

BRIEF DESCRIPTION OF THE DRAWING

FIGS. 5–7 illustrate tiling patterns for color sensor arrays.

FIG. 8 illustrates a tiling pattern for a monochrome sensor array.

DETAILED DESCRIPTION

In embodiments of the present invention, the effect of IR upon an image signal is substantially reduced by electronically subtracting signals generated by IR pixel sensors from signals generated by pixel sensors responsive to both IR and visible light. The IR pixel sensors are sensitive to the IR incident upon the array comprising the sensors, and provide the IR component of the image separately from the color channels (e.g., RGB).

The IR sensors can be created using the existing commercial Color Filter Array (CFA) materials, taking advantage of the fact that these materials are transparent to IR radiation. By a simple overlay of two CFA colors (e.g., R, B,) that have substantially no overlapping transmittance in the visible portion of the spectrum, it is possible to create a composite filter element which substantially blocks the visible light and transmits only IR. If two filters are used to form the composite filter, then each of the two filters has a visible radiation pass spectrum that is disjoint from the other, so that there is substantially no transmittance of visible light through the resulting composite filter formed from the combination of the two filters. If more than two filters are used, then each filter has a visible radiation pass spectrum such that the resulting composite filter is substantially opaque to visible light. This composite filter element is thus an IR pass filter, because each of the component filters used to form the composite filter is substantially transparent to IR.

Figure 1:
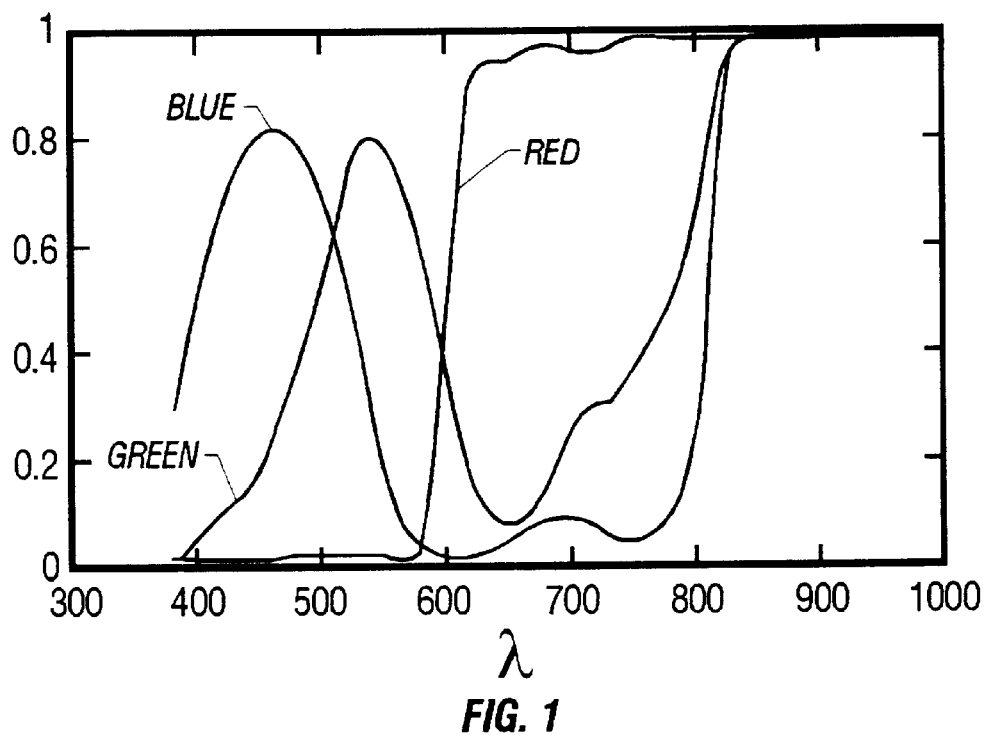
FIG. 1 illustrates the transmittance characteristics for conventional red, green, and blue CFA filters.
Figure 2:
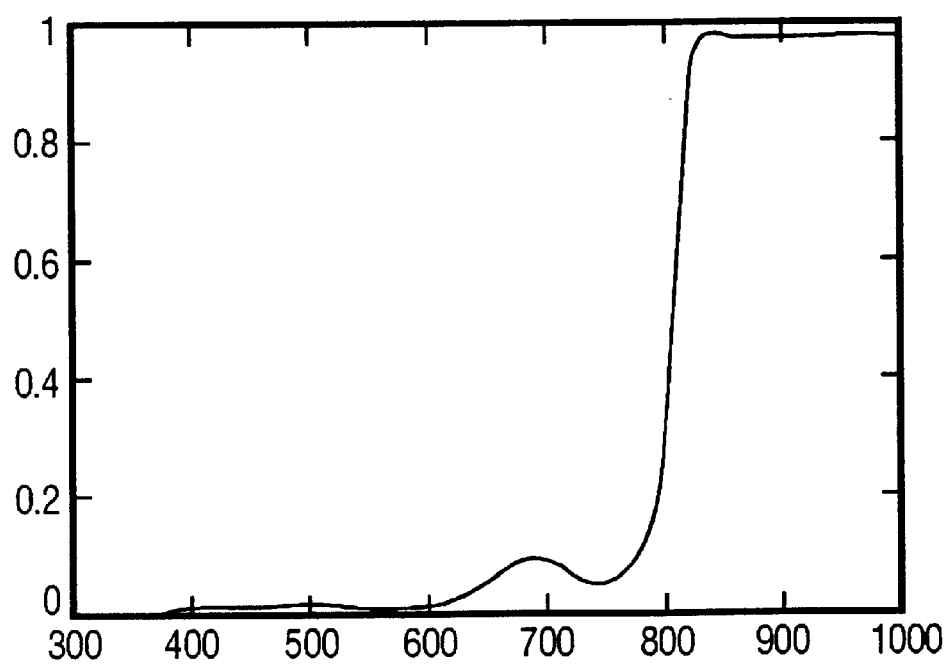
FIG. 2 illustrates the transmittance characteristics of an IR pass filter comprising red and blue CFA filters.

As an example, FIG. 1 shows the transmittance characteristics for conventional red, green, and blue CFA (pigmented acrylate) filters. Note that each filter is substantially transparent to IR. By overlaying red and blue CFA filters, the resulting transmittance of the composite IR pass filter is indicated in FIG. 2, which shows that the visible spectrum is substantially blocked.

The IR pass filter is used to create an IR sensitive pixel, or IR pixel sensor, by depositing the constituent filters making up the IR pass filter over a pixel circuit. This deposition can be accomplished by photolithographic techniques well known to the semiconductor industry. A pixel circuit is any circuit which absorbs radiation and provides a signal indicative of the absorbed radiation. For example, the pixel circuit may comprise a photodiode, where photons absorbed by the photodiode generate electron-hole pairs, along with additional circuits to provide an electrical signal, either a voltage or current signal, indicative of the number of photons absorbed by the photodiode.

Figure 3:
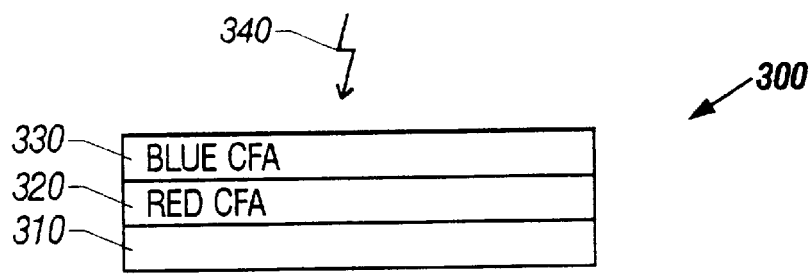
FIG. 3 is a simplified cross-section view of a pixel circuit with red and blue CFA filters deposited over the pixel circuit.

In one embodiment, FIG. 3 illustrates a simplified cross-sectional view of an IR pixel sensor 300, comprising pixel circuit 310 with red CFA 320 and blue CFA 330 deposited over pixel circuit 310. Photons in the visible region, incident upon the pixel circuit as pictorially indicated by direction 340, are substantially blocked or prevented from being absorbed by pixel circuit 310.

One embodiment uses an imaging array with four types of pixel sensors: three color (e.g., RGB) types and one IR type, all fabricated with commercially available CFA materials. This provides four channels, or four types of signals, as indicated in Table 1, where the spectrum measured for each channel or pixel type is indicated.

TABLE 1

Spectra for four output channels

| Output Channels | Spectrum |
|---|---|
| Channel 1 | Red + IR |
| Channel 2 | Green + IR |
| Channel 3 | Blue + IR |
| Channel 4 | IR Only |

Figure 4:
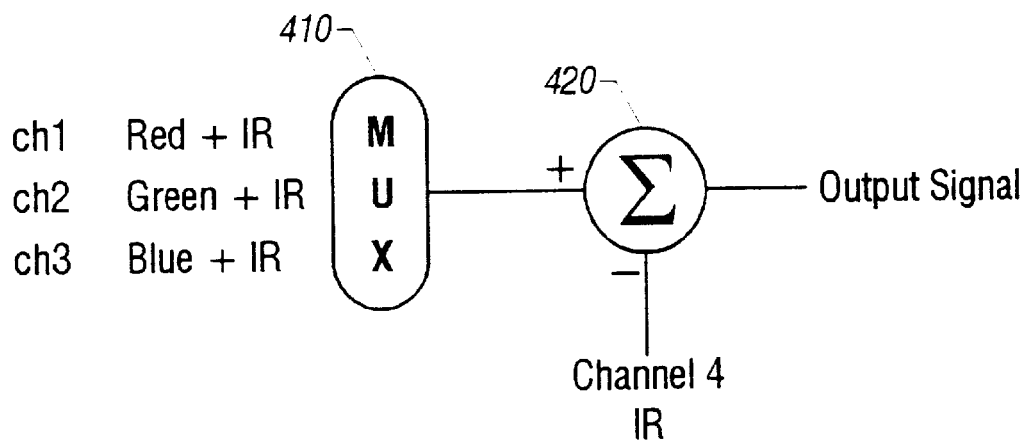
FIG. 4 is a simplified, high-level circuit of a differencing circuit for correcting the IR signal in the image signal.

The IR component of the image signal, once known, can be subtracted from the image to give IR corrected color outputs. This is indicated by a high-level circuit as shown in FIG. 4, where the IR signal on channel 4 is subtracted from each of the signals on channels 1–3 by multiplexer (MUX) 410 and differencing circuit 420. Clearly, MUX 410 is not needed if three differencing circuits are available to perform subtraction of the IR signal for each color channel.

Figure 5:
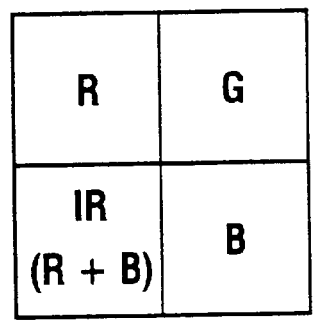

Possible tiling patterns for color images are indicated in FIGS. 5–7, and a tiling pattern for a monochrome image is indicated in FIG. 8, where W denotes a pixel sensor sensitive to the entire visible spectrum. Each pattern shown in FIGS. 5–8 may be considered a unit cell. Unit cells are repeated in a regular fashion throughout an imaging array.

In FIGS. 5–7, pixel sensors labeled R, G, and B indicate pixel sensors utilizing, respectively, red, green, and blue CFA filters. In FIGS. 5–8, pixel sensors labeled IR (R+B) are IR pixel sensors in which the composite IR pass filter comprises red and blue CFA filters.

The pixel sensors need not actually be in physical contact with each other. The pixel circuits making up a pixel sensor are typically electrically isolated from other pixel circuits. It is to be understood that a first pixel sensor is said to be contiguous to a second pixel sensor if and only if there are no intervening pixel sensors between the first and second pixels. For example, in FIG. 7, the upper left pixel sensor R is contiguous to the lower left pixel sensor G, the upper pixel sensor G, and the pixel sensor B, but it is not contiguous to the lower right pixel sensor G and the IR pixel sensor. Two pixel sensors may be contiguous without actually physically touching each other.

Due to chromatic aberration in the imaging lens system, the IR component of an imaged scene may not be in sharp focus. This is actually an advantage to the embodiments disclosed here because it implies that it is not necessary to sample the IR component with high spatial frequency. This is reflected in the tiling patterns indicated by FIGS. 7 and 8 for color and monochrome imagers, respectively.

An imaging array with IR pixel sensors, whether monochrome or color, may be used in a second mode as an IR imaging array, where only the signals from the IR pixel sensors are utilized to form an IR image. Thus, imaging arrays made according to the embodiments disclosed here may be configured as dual mode imaging arrays, providing either an IR corrected visible image or an IR image.

Embodiments with other color system may be realized, such as cyan, magenta and yellow (CMY) systems and magenta, white, and yellow (MWY) systems. In the case of the CMY color system, it may be necessary to overlay all three colors to block visible light. The approach could be extended to the MWY color system as well, but would require additional processing to add a third color (e.g. blue or cyan). This color may be required to enable complete blocking of the visible light in an IR sensing pixel.

Figure 9:
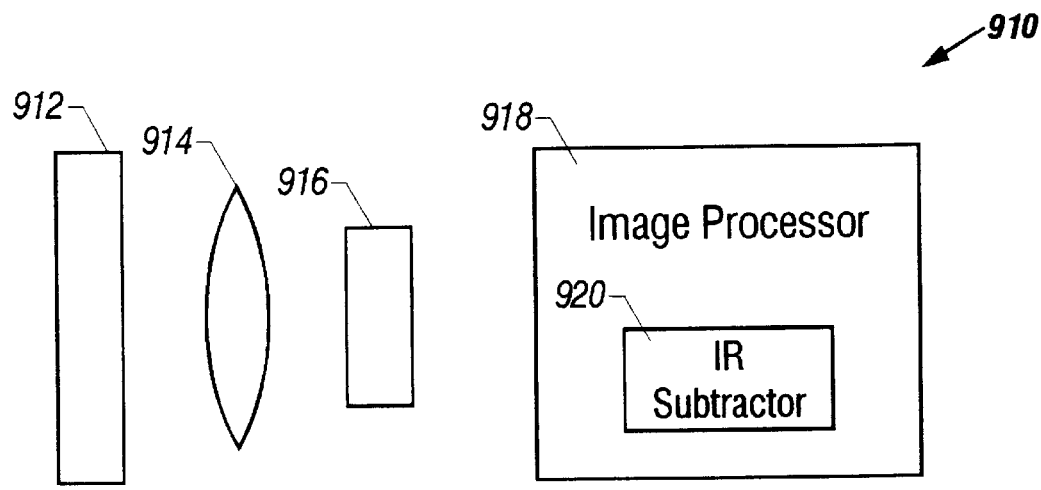
FIG. 9 is a schematic depiction of a camera using a color shutter.

A digital imaging system 910, shown in FIG. 9, may be used in connection with a digital camera which may provide stills and motion picture video. In addition the imaging system 910 may be used in other applications that use digital image sensors such as scanners and the like.

A liquid crystal color shutter 912 is positioned 1in front of a lens system 914 and an image sensor 916. The image sensor 916 may be a complementary metal oxide semiconductor (CMOS) image sensor which uses either an active pixel sensor (APS), a passive pixel sensor (PPS) system or other known techniques. Alternatively, a charge coupled device (CCD) sensor may be used.

The color shutter 912 provides electronically alterable transmission spectra in different color bands, such as the red, green and blue (RGB) or cyan, magenta, yellow (CMY) primary color bands. One exemplary color shutter is the KALA filter available from ColorLink, Inc. of Boulder, Colo. 80301. The shutter 912 is synchronously switched to successively provide color information in each of the desired bands. The KALA filter switches between an additive primary color (RGB) and a complementary subtractive primary color (CMY). Input white light is converted to orthogonally polarized complementary colors.

A color shutter is electronically switchable between transmission spectra centered in each of a plurality of additive color planes such as the red, green and blue (RGB) primary color planes. The color shutter may be sequentially switched to provide three color planes that are combined to create a three color representation of an image.

The use of color shutters in imaging systems may advantageously allow each pixel image sensor to successively respond to each of three color bands. Otherwise, separate pixel image sensors must be interspersed in the array for each of the necessary color bands. Then, the missing information for each pixel site, for the remaining two color planes, is deduced using interpolation techniques. With the color shutter, every pixel can detect each of three color bands, which should increase color definition without interpolation.

The image sensor 916 is coupled to an image processor 918 which processes the information from the image sensor 916 and provides an output in a desired form. The image processor 918 includes an infrared subtraction circuit 920. The circuit 920 uses a subtraction process to eliminate the infrared component from each of the color band signals synchronously provided by the color shutter 912. More particularly, the color shutter 912 may provide a series of light images in each of the desired color planes which activate pixels in the sensor 916 to produce intensity signals conveyed to the image processor 918.

The subtraction process can also be implemented in software. For example, the subtraction could be accomplished in a separate computer (not shown). The computer can be tethered to the camera.

Figure 10:
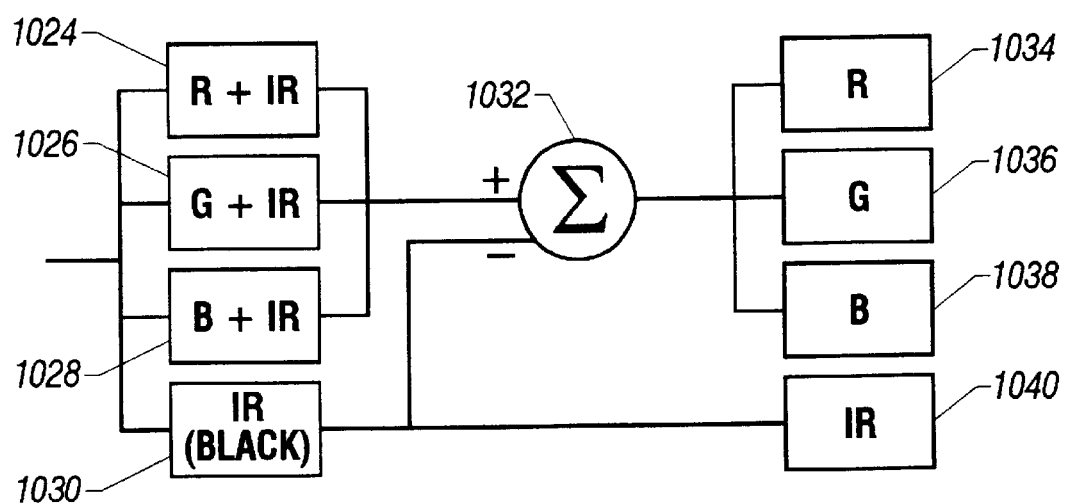
FIG. 10 is a block diagram showing the components which form the infrared subtraction circuit shown in FIG. 9.

Referring to FIG. 10, the information from the sensor 916 is then separated into four signals. The intensity signals provided by the sensor 916 include an infrared component with each of the color band signals. In an example using the RGB color bands, a red color signal 1024, a green color signal 1026, and blue color signal 1028 are produced, each with associated infrared components. In addition the shutter 912 produces a black signal 1030 which is substantially absent any color information and therefore only contains the infrared radiation information.

Thus, the black signal 1030 (which contains only information about the infrared radiation present on the shutter 912) may be subtracted in subtractor 1032 from each of the signals 1024 to 1028 to produce the signals 1034 to 1038 which are free of the infrared component. The infrared component may be made available at line 1040. The infrared component may be useful in a number of low light situations including night cameras, surveillance operations and three dimensional imaging applications.

In this way, the desired color planes may be produced absent infrared radiation noise, without using an infrared filter. Moreover, with the present techniques an infrared signal may be made available which may be useful in a number of applications. When an infrared filter is used, a useful infrared signal is not obtained.

Figure 11:
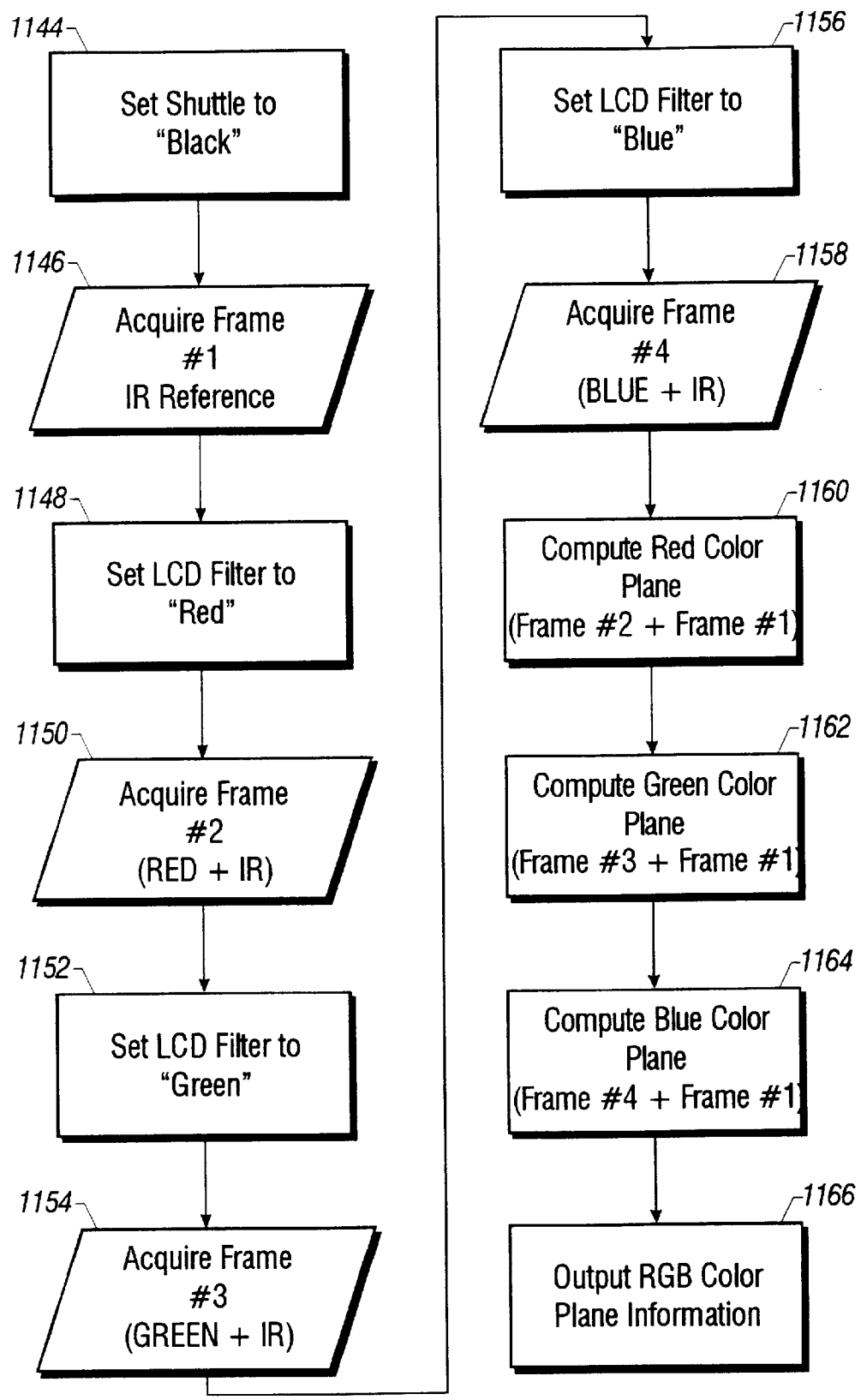
FIG. 11 is a flow chart showing the process of deriving infrared and three color information, using for example, the hardware shown in FIGS. 9 and 10.

Referring to FIG. 11, the process for capturing color information in the image processor 918 begins at block 1144. Initially, a color shutter 912 is set to black and a frame is acquired (as indicated in block 1146) to provide the infrared reference signal. Next the shutter is set to red (as indicated in block 1148) and a frame is acquired which includes the red information together with an infrared component (as indicated in block 1150). Similarly the green and blue information is acquired as indicated in blocks 1152 to 1158.

In blocks 1160, 1162 and 1164, the red, green and blue color planes are derived by subtracting the infrared reference acquired at block 1146 from the red, green and blue frames acquired in blocks 1150, 1154 and 1158. As a result, a RGB color plane information may be outputted (as indicated in block 1166) free of the infrared component.

The embodiments described above are also useful in compensating for dark current. Each embodiment produces color bands which are substantially free of both reference IR radiation effects and dark current. The IR reference signal 1146 includes dark current noise (without color information). Thus, when the IR reference or black frame is subtracted out, both the IR and dark current noise are eliminated. This is accomplished at the same time as the IR noise is removed, without requiring mechanical shutters or shielded pixels. Since the dark current is continuously subtracted out, the effect of current temperature on dark current is always taken into consideration.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. An imaging method comprising:
   sequentially producing a first output indicative of incident infrared radiation and the absence of incident visible light and a second output indicative of incident radiation in both the visible and infrared spectra; and
   subtracting said first and second outputs to produce an output corrected for infrared and dark current noise.

2. The method of claim 1 including forming a first output using a pair of filters with substantially non-overlapping transmittance of visible light.

3. The method of claim 2 including forming said first output using a liquid crystal color shutter.

4. The method of claim 1 including sensing color information in at least three color planes together with infrared information.

5. An imaging system comprising:
   a device sequentially tunable in a first state to transmit infrared radiation and radiation in the visible spectrum and in a second state to substantially block light in the visible spectrum while transmitting infrared radiation; and
   a subtracter to subtract signals indicative of the infrared radiation transmitted in said first and second sequential states.

6. The system of claim 5 wherein said device includes a liquid crystal color shutter.

7. The system of claim 6 including an image sensor that receives light information from the shutter in a plurality of color planes, said system further including an image processor coupled to said sensor to process information received from the image sensor.

8. The system of claim 7 wherein said image sensor provides signals indicative of at least three color planes and the infrared radiation to which the color shutter is exposed.

9. The system of claim 8 including a pair of filters with substantially non-overlapping transmittance of visible light to form an output substantially free of visible light.

10. A method comprising:
    sequentially producing a first and second signal, said first signal to indicate the transmission of visible and infrared radiation and said second signal to indicate the transmission of infrared radiation; and
    subtracting said second signal from said first signal.

11. The method of claim 10 wherein producing said second signal includes filtering light with a pair of filters that do not substantially overlap in their transmission of visible radiation.

12. The method of claim 10 wherein producing said second signal includes using a liquid crystal color shutter.

13. The method of claim 10 including sensing color information in at least three different color planes together with infrared radiation.

14. A method comprising:
    sequentially providing a first and a second filter, said first filter transmitting infrared light with visible light and said second filter selectively transmitting infrared light;
    detecting the transmittance of light through said first and second filters;
    providing a first output indicative of light transmittance through said first filter;

providing a second output indicative of light transmittance through said second filter; and subtracting said second output from said first output to correct for infrared and dark current interference.

15. The method of claim 14 including selectively transmitting visible light of specific wavelengths through said first filter.

16. The method of claim 14 including detecting the transmittance of light using a complimentary metal oxide semiconductor image sensor.

17. The method of claim 14 including detecting the transmittance of light using a charge coupled device.

18. The method of claim 14 including transmitting light through a liquid crystal color shutter.

19. The method of claim 14 including transmitting light through said second filter using a pair of filters that do not substantially overlap in their transmittance of visible light.

20. The method of claim 14 including sensing color information in at least three color planes together with infrared information.

21. A device comprising:
a first filter and a second filter, said first filter to selectively block visible radiation while allowing infrared radiation and said second filter to allow infrared radiation with visible radiation;

an image sensor to sense the radiation allowed by said first and second filters; and a subtracter to subtract the radiation allowed by said first sensor from the radiation allowed by said second sensor.

22. The device of claim 21 including a color shutter to allow radiation.

23. The device of claim 22 including an image processor to separate color information obtained from said shutter into color signals in three different planes and an infrared signal.

24. The device of claim 23 wherein the subtracter is coupled to the image processor and subtracts the infrared signal from each color signal obtained from the processor.

* * * * *